United States Patent [19]

Peppers et al.

[11] Patent Number: 4,845,766
[45] Date of Patent: Jul. 4, 1989

[54] SIMULTANEOUS PROJECTION FEATURE ANALYSIS APPARATUS

[75] Inventors: Norman A. Peppers, Belmont; James R. Young, Palo Alto; Gerald A. Pierce, Redwood City, all of Calif.; Kazuo Katsuki; Shuhei Tanaka, both of Doshomachi, Japan

[73] Assignee: Nippon Sheet Glass Co., Ltd., Osaka, Japan

[21] Appl. No.: 48,387

[22] Filed: May 11, 1987

[51] Int. Cl.$^4$ .............................. G06K 9/74
[52] U.S. Cl. ...................... 382/32; 382/31; 382/68
[58] Field of Search ............................ 382/31, 32, 68

[56] References Cited

U.S. PATENT DOCUMENTS

| | | | |
|---|---|---|---|
| 3,050,711 | 8/1962 | Harmon | 382/68 |
| 3,244,889 | 4/1966 | Preston et al. | 382/68 |
| 3,248,552 | 4/1966 | Bryan | 382/32 |
| 3,252,140 | 5/1966 | Lemay et al. | 382/32 |
| 3,274,550 | 9/1966 | Klein | 382/32 |
| 3,461,301 | 8/1969 | Fitzmaurice et al. | 382/32 |
| 3,506,837 | 4/1970 | Majima | 382/68 |
| 3,550,119 | 12/1970 | Rabinow | 382/32 |
| 4,573,198 | 2/1986 | Anderson | 382/31 |

OTHER PUBLICATIONS

Craig et al, "Bubble Domain Electronic-to-Optical Image Transducer", IBM Technical Disclosure Bulletin, vol. 13, No. 1, Jun. 1970, pp. 147–148.

Primary Examiner—Leo H. Boudreau
Assistant Examiner—Donald J. Daley
Attorney, Agent, or Firm—Woodcock Washburn Kurtz Mackiewicz & Norris

[57] ABSTRACT

In an apparatus for serially performing simultaneous feature processing and similarity discrimination of an image such as a character or any other figure, an input image is multiplied by a first multiplier into a plurality of optical pattern images which are respectively supplied to means for detecting different types of projection features. The means for detecting different types of projection features simultaneously performs different types of projection operations of the input image. The optical pattern image obtained by converting a vector corresponding to the different types of projection features is displayed on a vector display. The optical pattern image displayed on the display is multiplied by a second multiplier into optical images which are then respectively supplied to different types of reference masks. Optical pattern matching between the optical images from the second multiplier and the different types of reference patterns is simultaneously performed.

14 Claims, 6 Drawing Sheets

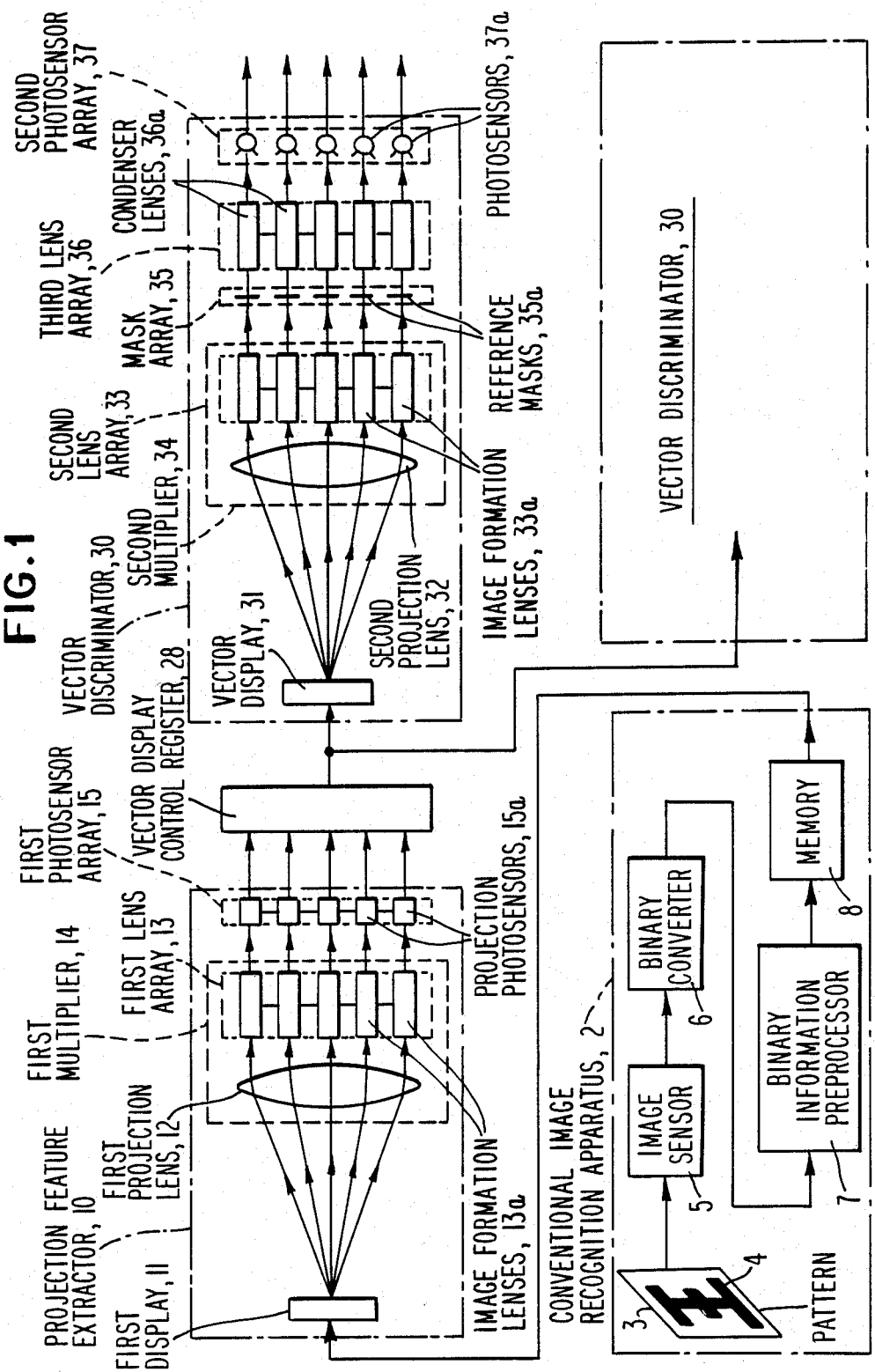

SIMULTANEOUS PROJECTION FEATURE ANALYSIS APPARATUS

BACKGROUND OF THE INVENTION

1 Field of the Invention:

The present invention relates to an apparatus for simultaneously projecting an image such as a character or any other figure and serially discriminating the degree of similarity between the image and a reference image, the apparatus being suitably used in an image recognition apparatus such as an OCR (Optical Character Reader).

2 Description of the Prior Art:

A conventional image recognition apparatus for recognizing an image such as a character and any other figure is designed to perform processing utilizing mainly electronic techniques.

A conventional image recognition apparatus will be briefly described. An image (input image) pattern subjected to image recognition and written on an original by printing or the like is focused by an optical lens on a light-receiving surface of an image sensor comprising a CCD or a MOS sensor. An analog signal as image information is output from the image sensor and is binarized by a proper threshold value (if there are multiple threshold values, multi-value conversion different from that described above is performed). The binarized signal is stored in a memory. The binarized image information is subjected to preprocessing for shaping the image, as needed. The preprocessed image information is stored in the above memory or another memory. Preprocessing includes noise reduction processing, normalization processing for positions, sizes, inclinations, and widths, and the like.

A feature extraction required for identifying an image is performed over the image information stored in the memory. A projection feature extraction method is used as one of techniques for extracting features. These projection features are extracted by a feature-processing section.

In order to extract features of an image on a given axis (e.g., the X-axis), the memory which stores the image information is scanned in a direction (e.g., the Y-axis) having a predetermined relationship with the given axis, and the image information is read out time-serially or parallel-time-serially. The readout image information is transferred to the feature-processing section. Pieces of the transferred image information are sequentially measured by the feature-processing section. Measured values sequentially obtained by such measurements are stored at predetermined positions corresponding to the given axis in the memory or another memory. A curve of an intensity distribution obtained by extracting features on the given axis is calculated on the basis of the stored measured values.

In recognition processing (to be described later), projection of a two-dimensional image pattern along one axis is not sufficient in order to improve reliability of similarity discrimination. For this reason, feature processing of a single image information must be performed on a large number of axes, thereby extracting different types of features. In order to extract features on a large number of axes, the following procedures are required:

(1) The above-mentioned feature processing is repeated in a single feature-processing section; or (2) A large number of feature-processing sections are arranged and at the same time, pieces of image information read out from the memories are respectively transferred to the feature-processing sections. The above-mentioned feature processing operations are simultaneously performed in the large number of feature-processing sections.

Recognition processing is performed to discriminate which input image of interest belongs to which image according to data of a large number of intensity distribution curves. This recognition processing is achieved by time-serial digital correlation calculations between the data of different types of intensity distribution curves and data of the intensity distribution curves of different types of reference patterns.

A large number of digital accumulated values constituting the intensity distribution curves are respectively corresponded to vector components, and each intensity distribution curve is dealt as one vector. A total of intensity distribution curves is dealt as a set of vectors. In this case, the set of intensity distribution curves may be dealt as a single vector, and the individual digital accumulated values of each intensity distribution curve are corresponded to vector components constituting the single vector.

In the same manner as described above, each intensity distribution curve of the reference pattern can also be defined in the form of vector.

A vector calculator incorporated in the image recognition apparatus digitally and time-serially calculates correlations between the input image vectors and reference pattern vectors. The vector calculator may be a vector calculator practically used in a conventional parallel pipeline type computer.

In the correlation calculations between the input image vectors and the reference pattern vectors, a distance and an angle between the vectors can be used as a factor for evaluating the degree of correlation therebetween. In practice, the distance between the vectors is used as a measure for the degree of deviation, and the cosine of the angle is used as a measure for the degree of similarity.

Variations in input image patterns are present due to a variety of expression formats of the original image, and the input image constitutes a cluster. Positional errors also occur in the input image. For this reason, the reference point of the intensity distribution of the input image does not normally match with that of the reference pattern. Therefore, in vector correlation calculations, an optimal correlation must be found to match the reference point of the input pattern with that of the reference pattern.

Optimal correlation between the input image vector and the reference pattern vector can be obtained by repeating the vector correlation calculations according to time-serial digital processing for every shift.

The above-mentioned vector correlation calculation processing allows discrimination of a reference pattern having a higher degree of similarity to the input image, i.e., the most resemble reference pattern.

However, in the conventional image recognition apparatus described above, processing is performed employing mainly electronic techniques. Processing time is inevitably prolonged as follows:

In order to improve discrimination precision of the degree of similarity, features on a large number of axes must be extracted in feature processing. However, in procedure (1), when the single feature-processing section is used to repeat feature processing, the memory which stores the image information is scanned in predetermined directions to sequentially read out the image information from the memory. These informations are transferred to the feature-processing section and are measured as the measured values. The intensity distribution curve must be obtained on the basis of the measured values. Therefore, the above operation must be repeated to prolong the feature processing time, thus degrading efficiency of feature processing.

In procedure (2), the intensity distribution curves are obtained after the image information is transferred and measured. The feature processing time is prolonged, although procedure (2) is not worse than procedure (1). Procedure (2) requires a large number of feature-processing sections, and thus the overall system configuration is undesirably complicated and high cost.

In correlation calculations for discriminating the degree of similarity, processing time is prolonged in the same manner as in feature processing. More specifically, the objects to be calculated are a large number of digital vector components. Discrimination of the degree of similarity between the input image and the reference pattern must be performed by repeating correlation calculations of a large number of vectors according to time-serial digital processing, in association with necessity for finding an optimal correlation.

In order to shorten the processing time, the above-mentioned vector calculator is used. However, this calculator depends on time-serial digital processing and does not essentially solve the problem of long processing time. In addition, a vector processor is built into such a vector calculator. Therefore, the entire system consequently becomes highly costly.

In the conventional image recognition apparatus described above, if nonlinear feature processing such as circumferential or radial projection (to be described later) is performed, individual linear scanning start and end positions along predetermined directions must be determined by a special function, and the range of nonlinear shape to be projected must be determined by a set of a large number of linear scanning cycles. Therefore, it is not easy to perform nonlinear projection of image information and thus it is very difficult to increase the image recognition rate.

SUMMARY OF THE INVENTION

It is, therefore, an object of the present invention to provide a simultaneous projection feature analysis apparatus wherein, by introducing optical simultaneous processing into input image feature processing and correlation calculation processing, projection features of the input image can be extracted and the degree of similarity can be serially discriminated with a simple arrangement at high speed.

According to the present invention, there is provided a simultaneous projection feature analysis apparatus comprising: first multiplying means for optically multiplying an input image to form a plurality of optical pattern images each having a substantially identical shape; different types of projection detecting means for respectively detecting different types of one-dimensional projection intensity distribution in a plurality of direction from the plurality of optical pattern images; a vector display for causing the different types of one dimensional projection intensity distributions to respectively correspond to vectors and for displaying predetermined optical pattern images at positions corresponding to magnitudes of vector components constituting the vector; different types of reference masks respectively having reference patterns so as to match with the predetermined optical pattern images; second multiplying means for optically multiplying the predetermined optical pattern image displayed on the vector display to form a plurality of optical pattern images of a substantially identical shape near the different types of reference masks; and photodetecting means for matching the optical pattern images formed by the second multiplying means with the reference patterns to detect lights passing through the different types of reference masks.

In the simultaneous projection feature analysis apparatus having the arrangement described above, the input image can be multiplied by the first multiplying means into a plurality of optical pattern images of a substantially identical shape at a light propagation speed. At the same time, these optical pattern images are respectively supplied to the different types of means for detecting projection features. Feature processing in the different types of means for detecting the projection features allows simultaneous but different types of projections of the input image.

After an optical pattern image obtained by converting the vectors corresponding to the different types of projections into an image is displayed on the vector display, the optical pattern image is multiplied by the second multiplying means into a plurality of optical pattern images of a substantially identical shape at the light propagation speed. These optical pattern images are respectively supplied to the different types of reference masks. At the same time, the optical pattern images are simultaneously matched with the reference patterns of the different types of reference masks. The lights from the reference masks after optical pattern matching can be detected by the photodetecting means at high speed.

According to the present invention as described above, multiplication of the input image by the first multiplying means and feature processing of the multiple images in the means for detecting the projection features are performed substantially at the light propagation speed. After each projection is displayed on the vector display as the optical pattern image so as to correspond to the vector, the optical pattern image is multiplied by the second multiplying means, the multiple optical pattern images are optically matched with the reference patterns, and detection of the lights as a result of optical pattern matching by the photodetecting means can be performed, substantially at the light propagation speed respectively.

Processing times of feature processing for extracting projection features of the input image and pattern matching for discriminating the degree of similarity can be greatly shortened by simultaneous optical processing, thus achieving high-speed processing.

The means for detecting a projection feature is designed to perform feature processing using an optical technique for a two-dimensional optical pattern image. Unlike in the conventional projection wherein only linear projection depending on digital techniques is performed, nonlinear projection can be easily achieved. Therefore, various features of the input image can be extracted to improve the recognition rate of the input image.

The apparatus comprises a low-packing density combination of: an optical system having the first and second multiplying means; an image display system having the vector display, a detection system having the means for detecting the projection features and the photodetecting means, and a mask system having the different types of reference masks. As compared with the conventional digital apparatus having an equivalent function, the apparatus configuration can be simplified and low cost.

BRIEF DESCRIPTION OF THE DRAWINGS

FIGS. 1 to 14 show an embodiment wherein the present invention is applied to an image recognition apparatus, in which:

FIG. 1 is a schematic view of a simultaneous projection feature analysis apparatus;

FIG. 3 is a front view of an X'-axis projection photosensor;

FIG. 4 is a front view of a matrix-like projection photosensor;

FIG. 5 is a front view of an X'-axis projection photosensor for local projection;

FIG. 6 is a front view of an X-axis projection photosensor for the same local projection as in FIG. 5;

FIG. 7 is a front view of a circumferential projection photosensor;

FIG. 8 is a front view of a radial projection photosensor;

FIG. 9 is a graph showing intensity distribution curves obtained by projections along the X- and Y-axes;

FIG. 10 is a front view of a vector display;

FIG. 11 is a front view of the vector display, showing a state wherein bright line patterns representing the feature of Chinese input character "王" are formed;

FIG. 12 is front view of reference mask having reference patterns respectively corresponding to the bright line patterns representing the feature of Chinese character "王";

FIG. 13 is a schematic perspective view showing part of a means for detecting a projection feature along the X-axis according to another embodiment of the present invention; and FIG. 14 is a front view showing part of the vector display of another embodiment, the vector display being corresponding to that in FIG. 11.

DETAILED DESCRIPTION OF THE PREFERRED EMBODIMENTS

Figure 2A:
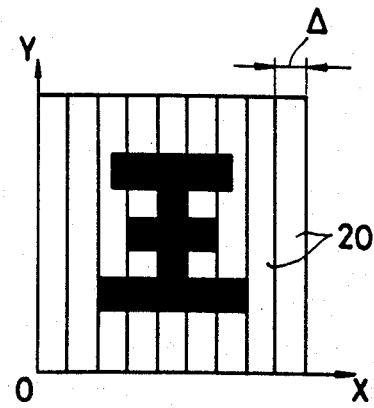
FIG. 2A is a front view of an X-axis projection photosensor.

An embodiment will be described with reference to the accompanying drawings wherein the present invention is applied to an image recognition apparatus.

FIGS. 1 to 14 show an embodiment of the present invention. A projection feature extractor 10 will be described with reference to FIG. 1. In the same manner as in the conventional image recognition apparatus 2, an image pattern 3 on an original 4 is converted by an image sensor 5 into image information. The image information is converted as at 6 into binary information, and the binary information is preprocessed as at 7. The preprocessed information is stored in a memory 8 as needed. The information from the memory is displayed as an optical input image on the screen of a first display 11 comprising a cathode-ray tube or the like. The image on the screen is guided to a first lens array 13 through a first projection lens 12 located spaced apart from the screen by a focal length of the lens 12 along the forward optical path.

A first photosensor array 15 having a large number of projection photosensors 15a is arranged in front of the first lens array 13. The first lens array 13 comprises image formation lenses 13a respectively corresponding to the projection photosensors 15a. The same optical images as the image formed on the screen of the display 11 are respectively formed on the light-receiving surfaces of the projection photosensors 15a. A plate microlens having microlenses (e.g., gradient index lenses) formed in a plate made of glass, synthetic resin, or the like may be used as the first lens array 13. The number of microlenses such as gradient index lenses is the sam as that of the projection photosensors 15a. An SLA (tradename) available from Nippon Sheet Glass Co., Ltd. and having gradient index cylindrical lenses may be used as the first lens array 13. In this case, the number of gradient index cylindrical lenses is the same as that of the projection photosensors 15a. A resin is filled in the gradient index cylindrical lenses such that they are located at positions corresponding to those of the image formation lenses 13a.

The first projection lens 12 and the first lens array 13 constitute a first multiplier 14 for optically multiplying the input image. The input image on the screen of the display 11 and guided to the first lens array 13 through the first projection lens 12 is multiplied by the image formation lenses 13a and the multiple images are respectively simultaneously formed on the light-receiving surfaces of the projection photosensors 15a. The number of projection photosensors 15a can be determined according to the types of projection features. The number of image formation lenses 13a can be determined according to the number of projection photosensors 15a.

Electrical signals corresponding to the intensity distribution curves having the projection features inherent to the images formed on the light-receiving surfaces of the projection photosensors 15a are output from the projection photosensors 15a, respectively, as will be described later.

Examples of the photosensors used as the projection photosensor 15a shown in FIG. 1 will be described with reference to FIGS. 2 to 8. In this case, as shown in FIG. 2, 3, 7 and 8, Chinese character "王" is displayed on the screen of the display 11 and is also formed on the light-receiving surface of the projection photosensor 15a.

Figure 2B:
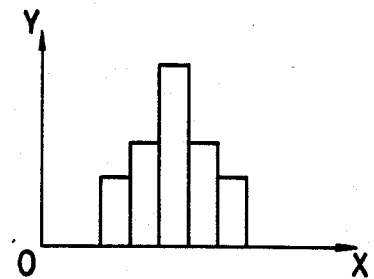
FIG. 2B is a graph showing an intensity distribution curve obtained from the X-axis projection photosensor shown in FIG. 2A.
Figure 3:
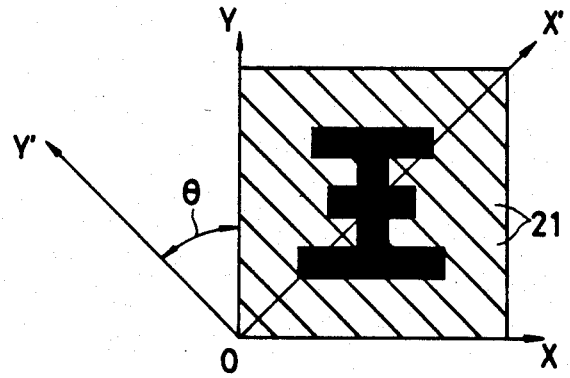
Figure 4:
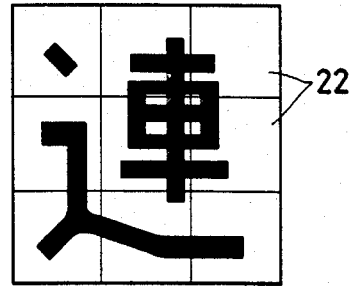

The photosensors shown in FIGS. 2 to 6 are used to perform linear projection. In particular, the photosensors in FIG. 2 to 4 are used to project an entire pattern of an input character. The photosensor shown in FIG. 2A is designed to project an image on the X-axis. The photosensor consists of a large number of photosensor elements 20 (9 elements in FIG. 2A) each having a stripe-like light-receiving surface of a width Δ. The photosensor elements 20 are aligned such that the sides thereof are adjacent to each other. The photosensor elements 20 constitute a substantially square light-receiving surface. Electrical signals corresponding to the projection features are output from the photosensor elements 20 according to the shape of the image formed on the light-receiving surface of the photosensor. The intensity distribution curve along the X-axis, as shown in FIG. 2B, can be obtained from these electrical signals. Sensor outputs are the ones normalized by ratios of projection areas to the total light-receiving areas of the photosensor elements 20, respectively.

The photosensor shown in FIG. 3 has a pattern obtained by rotating the photosensor pattern of FIG. 2A through any angle $\theta$ about the origin. The photosensor shown in FIG. 3 consists of a large number of photosensor elements 21 each having a stripe-like light-receiving surface having a width $\Delta$ in the same manner as in the photosensor of FIG. 2A. However, the photosensor in FIG. 3 is designed to project an image along the X'-axis (i.e., an oblique direction) obtained by rotating the X-axis through an angle $\theta$. In this case, $\theta = 45°$, 90° or 135°. However, the angle $\theta$ may vary as needed.

The photosensor shown in FIG. 4 is a matrix-like projection photosensor. Photosensor elements 22 (nine in this case) respectively having square light-receiving surfaces are arranged in a matrix form. These photosensor elements 22 are arranged such that the sides thereof are adjacent to each other. The photosensor elements 22 constitute a square light-receiving surface as a whole. A Chinese character "达" is formed on the light-receiving surface of the photosensor.

Projection on the X-axis as an identical axis is performed in each photosensor element 22. The photosensor elements 22 generate sensor outputs corresponding to light intensity levels of the image portions formed on the corresponding light-receiving surfaces. For this reason, according to this photosensor, the overall feature such as the concentrated state of the image pattern can be extracted for the input image.

The above photosensor can extract projection features corresponding to a two-dimensional distribution state of the image pattern. For example, the projection feature of a shinnyu "辶" distributed from the vertical direction to the horizontal direction in the input Chinese character "达" can be extracted separately from other patterns in the character.

Figure 5:
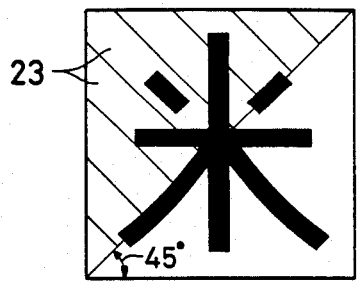
Figure 6:
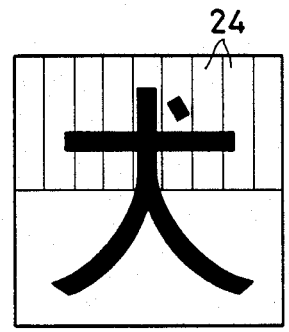

The photosensors shown in FIGS. 5 and 6 are local linear projection photosensors, respectively. The photosensor in FIG. 5 is obtained such that $\theta = 45°$ is given in the X'-axis projection sensor shown in FIG. 3 and that photosensor elements 23 are arranged only on the upper side with respect to a diagonal line inclined from the upper right corner to the lower left corner. Therefore, the photosensor in FIG. 5 has a light-receiving area of a rectangular triangle.

According to the above photosensor, the projection feature of a substantially ½ image pattern in the oblique direction, i.e, the upper left pattern of the image formed on the photosensor can be extracted. By using this local projection photosensor, the projection feature of the character having, for example, a radial distribution pattern can be effectively extracted.

In the case of FIG. 5, a Chinese character "米" is formed on the photosensor shown in FIG. 5. The upper left " \ ", the lower right " \ ", the upper right " / ", and the lower left " / " are substantially symmetrical about the cross "+" in the character "米". A Chinese character "木" is similar to the character "米". However, the character "米" is different from the character "木" in that the upper right and left patterns " / " and " \ " are added.

When the X'-axis projection photosensor shown in FIG. 3 is used, the upper left and lower right patterns " \ " and " \ " or the upper right and lower left patterns " / " and " / " may be formed on the identical photosensor element. A probability of these patterns included in single projection data is very high. Therefore, since the intensity distribution obtained as the projection feature is similar to that of the character "木", it is difficult for the photosensor in FIG. 3 to discriminate the character "米" from the character "木".

However, according to the photosensor shown in FIG. 5, the upper left pattern " \ " is formed on the light-receiving surface of the photosensor element 23 and the lower right pattern " \ " is not detected Therefore, the projection feature corresponding to the upper left pattern " \ " can be independently extracted at a high S/N ratio. If the light-receiving portion is formed on only the lower side with respect to a diagonal line inclined from the upper right corner to the lower left corner, the projection feature of the lower right pattern " \ " can be independently extracted.

As described above, when feature extraction is performed by oblique projection, the light-receiving portion is formed at least on the upper or lower side with respect to a diagonal line in a direction crossing the projection direction. If the projection feature is obtained from the image pattern formed on the light-receiving portion, the similar images having different patterns in, e.g., the oblique direction can be distinctly discriminated from each other.

In the photosensor for performing local projection in an oblique direction, a single light-receiving surface can be formed on the upper or lower side having no light-receiving surface with respect to the diagonal line.

In the X'-axis projection photosensor shown in FIG. 3, the diagonal line portion crossing the projection direction may be insulated to extract different projection data from the respective photosensor elements, thereby obtaining the same discrimination effect for the similar images as described above.

In this case, in the single photosensor, images formed on the light-receiving surface is divided into upper and lower portions with respect to the diagonal line. Two projection features can be extracted from the two divided image patterns. Therefore, the projection features suitable for the image patterns representing a image with originally separated patterns in the oblique direction can be obtained.

In the photosensor shown in FIG. 6, photosensor elements 24 are formed in the upper half in the X-axis projection sensor shown in FIG. 2A. According to this photosensor, X-axis projection can be performed for a substantially ½ image pattern distributed in the upper half of the image formed thereon.

By using the local projection photosensor, the projection feature of a character having, e.g., a pattern " \ " in the upper or lower portion thereof can be effectively extracted.

In the case of FIG. 6, a Chinese character "犬" is formed on the photosensor. The character "犬" includes a pattern " \ " on the right shoulder of a Chinese character "大". A character similar to the character "犬" is having the pattern "太" at the substantially center of the lower portion thereof.

In the cases of the characters "犬" and "太", the patterns " \ " are very small in the entire character patterns. Projections corresponding to the patterns " \ " tend to be masked by the entire intensity distribution patterns. For this reason, in the X-projection photosensor shown in FIG. 2A, it is difficult to extract the projection feature of " \ " and it is unable to clearly discriminate the character "犬" from the character "太".

In the local projection photosensor shown in FIG. 6, however, only the upper portion including the pattern " ﹨ " in the character pattern of "犬" is formed on the light-receiving surface. The lower portion including the pattern " ﹨ " in the character "太" is not formed on this photosensor. Therefore, according to this photosensor, the image formation area is reduced to ½, and the projection feature corresponding to the pattern " ﹨ " of the character "犬" can be appropriately extracted at a high S/N ratio. For this reason, the similar characters "犬" and "太" can be clearly discriminated from each other.

In the local X-axis projection photosensor, if the light-receiving portion is formed on only the lower half of the surface of the photosensor, the projection feature corresponding to the pattern " ﹨ " of the character "太" can be extracted. In the same manner as in the above photosensor, the similar characters "犬" and "太" can be clearly discriminated from each other.

When feature extraction is performed by projection on the X-axis, the light-receiving portion is formed on only the upper or lower side along the X-axis to obtain a local projection feature of the image pattern formed on the light-receiving portion. Therefore, similar images having identical patterns on either the upper or lower portions of the patterns can be clearly discriminated.

In the above photosensor, a single light-receiving surface may be formed on the upper or lower side having no light-receiving surface.

In the X-axis projection photosensor shown in FIG. 2A, a central line portion along the X-axis may be insulated to divide the light-receiving surface of the photosensor into halves and projection data from the divided photosensor elements may be produced to obtain the same effect as described above.

The local projection photosensors described above may include a photosensor (not shown) having a function for detecting an end position of a character pattern.

The photosensor having the above function may be exemplified by a photosensor wherein sensor arrays obtained by arranging small photosensor elements along a predetermined direction are arranged at a side end portion of the photosensor along the X- or Y-axis.

When the photosensor having the above sensor arrays is used, the start position of the character pattern along the predetermined direction can be detected.

Figure 7:
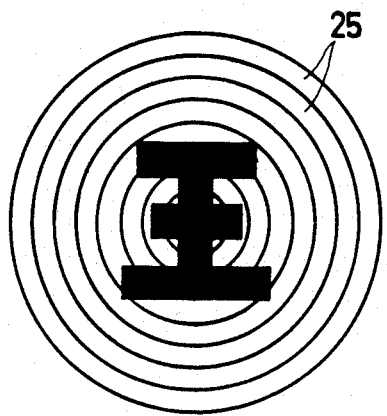
Figure 8:
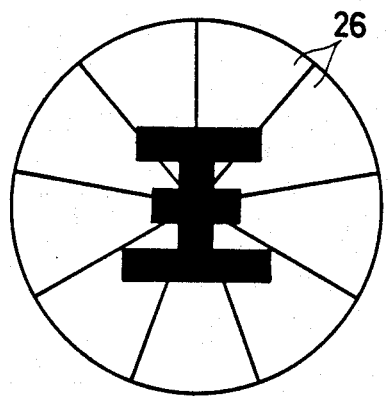

Photosensors shown in FIGS. 7 and 8 are designed to perform nonlinear projection. More specifically, the photosensor in FIG. 7 is designed to perform circumferential projection and consists of a large number of concentric photosensor elements 25 (9 elements in this case). The central one of the photosensor elements 25 has a circular light-receiving surface having a small diameter. The remaining photosensor elements 25 are ring-like light-receiving surfaces having different diameters but the same width. The width of these peripheral photosensor elements 25 is substantially the same as the radius of the central photosensor element 25. The photosensor elements 25 are arranged such that the outer circumference of an inner unit serves as the inner circumference of an outer unit adjacent thereto. The photosensors units 25 constitutes a circle as a whole.

In the photosensor of FIG. 7, even if an image to be formed on the light-receiving surface is rotated by one revolution, the intensity distribution curve free from the influence of rotation can be obtained. Therefore, projection features free from the influences of rotation can be extracted.

A photosensor shown in FIG. 8 is designed to perform radial projection and consists of a large number of sector-shaped photosensor elements 26 (9 elements in this case) having identical light-receiving surfaces. The photosensor elements 26 are arranged around one point such that vertices of the elements 26 get together. In this state, sides (radii) of the adjacent light-receiving surfaces are adjacent to each other to constitute a substantially circular light-receiving surface.

In the photosensor of FIG. 8, even if an image focused on the light-receiving surface is deviated from the center, such a deviation does not influence the intensity distribution curve. Therefore, projection features free from errors caused by the deviation of the image from the center (i.e., a limited area) can be extracted.

In the photosensors shown in FIGS. 2 to 8, a large number of photosensor elements 20 to 26 can be arranged on a common substrate. In this case, transparent electrodes are normally formed on the substrate, so that a space between the adjacent two of the elements 20 to 26 is preferably formed to prevent the electrodes from being electrically connected to each other.

As is apparent from the above description, the first photosensor array 15 includes various types of projection photosensors 15a. For example, the array 15 includes one X-axis projection photosensor shown in FIG. 2A, three X'-axis projection photosensors having $\theta = 45°$, 90°, and 135°, as shown in FIG. 3, one matrix-like projection photosensor shown in FIG. 4, four local projection photosensors (FIG. 5) each with the photosensor elements 23 on one diagonal line side, four photosensor elements (FIG. 6) each with the photosensor elements 24 on one vertical or horizontal bisector side, one circumferential projection photosensor shown in FIG. 7, and one radial projection photosensor shown in FIG. 8, i.e., a total of fifteen projection photosensors. Fifteen intensity distribution curves having different projection features can be obtained from the electrical signals generated by these photosensor elements 20 to 26.

In the projection feature extractor 10 described above, after the input image is displayed on the screen of the display 11, the image is multiplied by the first multiplier 14 into multiple images of a identical shape at a light propagation speed, and these multiple images are respectively formed on the light-receiving surfaces of the different types of projection photosensors 15a. Therefore, feature processing by the projection photosensors 15a allows simultaneous formation of different types of projection features (intensity distributions).

When the normalized sensor outputs constituting the intensity distribution curves corresponding to the projection features inherent to the input image are output from the projection photosensors 15a of the projection feature extracter 10, these normalized sensor outputs are displayed as optical images corresponding to the vectors on the screen of a vector display 31 of a vector discriminator 30 under the display control of a vector display control register 28.

In the vector discriminator 30, the two-dimensional pattern obtained by converting into an image the vectors corresponding to the projection features of the input image are used for calculating the correlations with a large number of reference patterns according to optical pattern matching. In this embodiment, the projection features are limited to the intensity distributions along the X- and Y-axes.

Figure 9:
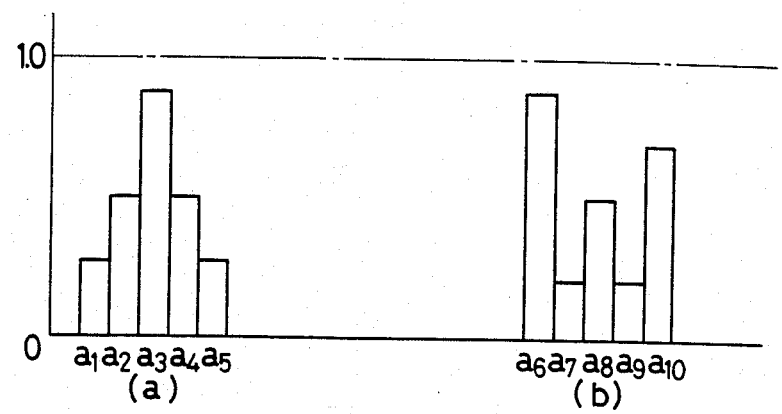

FIG. 9 shows an X-axis projection intensity distribution curve (a) and a Y-axis projection intensity distribution curve (b), both of which are obtained by extracting the features from Chinese character "三". In this case, the vector corresponding to the projection features of Chinese character "三" consists of five vector components $a_1$ to $a_5$ corresponding to the X-axis projection data (X-axis normalized sensor outputs) and vector components $a_6$ to $a_{10}$ corresponding to the Y-axis projection data (Y-axis normalized sensor outputs). These ten vector components are displayed as bright line patterns on the the vector display 31 under the control of the vector display control register 28.

A large number of pieces of discrete projection data shown in FIGS. 9(a) and 9(b) are displayed as a large number of bright line patterns on the vector display 31 of FIG. 1. For this reason, the display screen of the vector display 31 is divided into predetermined rectangular areas 41 to 50 respectively assigned to the vector components $a_1$ to $a_{10}$ as indicated by an alternate long and short dash line 38 in FIGS. 10 and 11.

Figures 10, 11, 12:
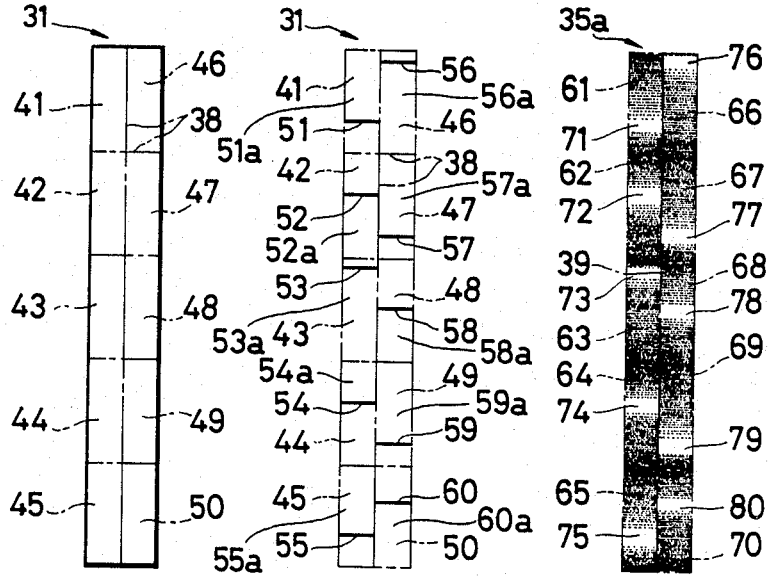

As shown in FIG. 11, the vector components are respectively displayed as bright lines 51 to 60 at level positions proportional to the lengths of the vectors in the areas 41 to 50. When the bright lines 51 to 60 are displayed on the corresponding areas 41 to 50, the bright line patterns (to be referred to as bright line patterns 51a to 60a hereinafter) are displayed as optical patterns corresponding to the vectors. Projectron data of input Chinese character "三" shown in FIG. 9 is displayed as 10-dimensional vectors on the vector display 31. The relative lengths, i.e., rating values, of the vector components $a_1$ to $a_{10}$ are shown in the following table. The vector components $a_1$ to $a_{10}$ are displayed as the bright line patterns 51a to 60a at positions corresponding to the rating values in the areas 41 to 50 in the vector display 31, the areas 41 to 50 being designed to correspond to the vector components $a_1$ to $a_{10}$.

| Vector component | Rating Value of Vector Component |
| --- | --- |
| $a_1$ | 0.3 |
| $a_2$ | 0.6 |
| $a_3$ | 0.9 |
| $a_4$ | 0.6 |
| $a_5$ | 0.3 |
| $a_6$ | 0.9 |
| $a_7$ | 0.2 |
| $a_8$ | 0.5 |
| $a_9$ | 0.2 |
| $a_{10}$ | 0.7 |

A second projection lens 32 is spaced apart from the front surface of the vector display 31 by a focal length of the second projection lens 32. Lights from the bright line patterns 51a to 60a displayed on the display screen of the vector display 31 are collimated by the second projection lens 32. The collimated lights are guided to a mask array 35 through a second lens array 33.

The mask array 35 comprises a large number of reference masks 35a substantially located on a single plane. The second lens array 33 comprises image formation lenses 33a respectively corresponding to the reference masks 35a and has substantially the same arrangement as the first lens array 13.

The second projection lens 32 and the second lens array 33 constitute a second multiplier 34 for optically multiplying the bright line pattern group as the set of bright line patterns 51a to 60a. The bright line patterns displayed on the display screen of the vector display 31 and guided on the second lens array 33 through the second projection lens 32 are simultaneously and respectively formed on reference masks 35a by the image formation lenses 33a.

The reference mask 35a has predetermined rectangular areas 61 to 70 corresponding to the areas 41 to 50 of the vector display 31, as indicated by an alternative long and short dashed lines 39 in FIG. 12. Reference patterns 71 to 80 having an intensity polarity same as that of the bright line patterns 51a to 60a are formed in the areas 61 to 70, respectively. The size of the areas 61 to 70 of the reference mask 35a may be the same as or different from that of the areas 41 to 50 of the vector display 31. Essentially, the bright line patterns 51a to 60a are formed on the reference patterns 71 to 80 by the second multiplier 34 such that one-to-one correspondence between the areas 41 to 50 of the display 31 and the areas 61 to 70 of the reference mask 35a is established.

Various kinds of reference masks, the number of which is the number of discrimination operations such as recognition processing and recognition, are used as the reference masks 35a. The reference mask 35a shown in FIG. 12 has the reference patterns 71 to 80 corresponding to the bright line patterns 51a to 60a of Chinese character "三" shown in FIG. 11 and are used to recognize Chinese character "三".

The reference patterns 71 to 80 serve as a gray scale because the concept of so-called "blurring" is introduced. Even if a character to be discriminated is a printed Chinese character, the printed Chinese character has many forms, and a positional error often occurs in a case of a handwritten Chinese character. Unless the reference patterns 71 to 80 serve as the gray scale, it is difficult to establish pattern matching between the bright line patterns 51a to 60a corresponding to the character to be discriminated and the reference patterns 71 to 80 corresponding to the character.

However, in this embodiment, since the reference patterns 71 to 80 constitute the gray scale, pattern matching adaptive for styles of characters and positional errors to some extent can be performed.

The bright line patterns 51a to 60a displayed on the vector display 31 are formed on different types of reference mask 35a by the second multiplier 34, respectively. In this case, image formation is performed such that one-to-one correspondence between the areas 41 to 50 of the vector display 31 and the areas 61 to 70 of the reference mask 35a is established. The lights passing through the reference masks 35a are focused by a large number of condenser lenses 36a of a third lens array 36 located in one-to-one correspondence with the reference masks 35a. The focused beams are then guided onto a second photosensor array 37. The third lens array 36 has the same arrangement as that of the first or second lens array 13 or 33.

The second photosensor array 37 comprises a large number of photosensors 37a arranged in one-to-one correspondence with the condenser lenses 36a and located near the focal points of the condenser lenses 36a. The light passing through the reference mask 35a is focused by the condenser lens 36a, and the intensity of this light is detected by the photosensor 37a. In this case, when the intensity of the light detected by the photosensor 37a is near the rating intensity, this reference mask 35a matches well with the bright line patterns 51a to 60a of the image to be discriminated.

Outputs from the photosensors 37a are rated in units of reference masks 35a according to the maximum intensity of the light passing through the reference mask 35a in order to make image discrimination easy. The levels of the rated outputs are compared with each other in a maximum value detector (not shown), and the reference mask 35a giving the maximum output is discriminated. By this discrimination result, recognition processing or recognition of the image to be discriminated is performed. A peak detector is additionally arranged in the maximum value detector, and only sensor output levels exceeding a threshold value of the peak detector are compared to reduce the number of sensor outputs to be compared.

In the vector discriminator 30 having the arrangement, after the bright line patterns 51a to 60a obtained by representing the projection data as vector components are displayed on the vector display 31, multiplication of the bright line patterns 51a to 60a, optical matching between the multiplied bright line patterns 51a to 60a and the reference patterns 71 to 80, and focusing of the light passing through the reference mask 35a by means of the condenser lens 36a can be performed at a light propagation speed. The focused lights can be simultaneously detected by the large number of photosensors 37a in high response time.

In the above embodiment, the photosensor elements 20 to 26 having predetermined patterns are used to constitute different types of projection photosensors 15a. However, a large number of pairs each consisting a slit mask and a plain photosensor may be used to constitute different types of projection photosensors 15a.

Figure 13:
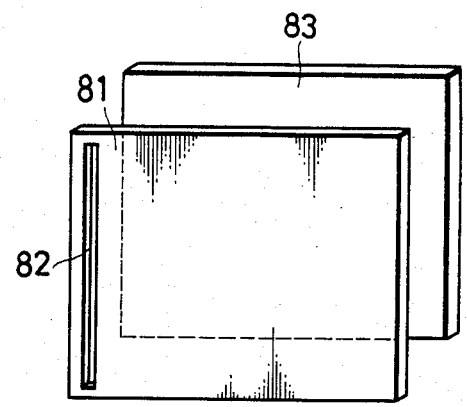

FIG. 13 shows part of a means for detecting a projection feature on the X-axis, the means consisting of a large number of pairs each consisting of a slit mask 81 and a plain sensor 83.

The means for detecting a projection feature on the X-axis comprises nine slit masks 81 having projection slits 82 substantially corresponding to the nine photosensor elements 20 of FIG. 2A, and nine plain sensors 83 arranged in one-to-one correspondence with the slit masks 81. Therefore, the means for detecting a projection feature is constituted by nine mask-sensor pairs. The mask-sensor pairs are located in one-to-one correspondence with the image formation lenses 13a shown in FIG. 1. The optical image on the screen of the display 11 is multiplied through the first projection lens 12, the image formation lenses 13a, and the projection slits 82 of the slit masks 81, and the multiple images are respectively formed on the light-receiving surfaces of the plain sensors 83.

FIG. 13 shows part of the means for detecting a projection feature on the X-axis. However, the projection photosensors shown in FIGS. 3 to 8 may be modified in the same manner as described above. When the projection photosensor 15a is constituted by a large number of pairs each consisting of the slit mask 81 and the plain sensor 83, nine mask-sensor pairs are required in place of the projection photosensor 15a. Therefore, the number of image formation lenses 13a is multiplied with nine, as compared with the case shown in FIG. 1.

Referring to FIG. 13, a light condensing means may be used in place of the plain sensor 83. In this case, since the light passing through the projection slit 82 is condensed by the light condensing means, the intensity distribution having a projection feature can be optically displayed. For example, a lens or prism having one end as a flat light-receiving surface having substantially the same pattern as one of the photosensor elements 20 to 26 shown in FIGS. 2 to 8 can be used as the light condensing means. In this case, the lens or prism having the light-receiving surface is tapered from one end to the other end thereof. The light incident on the light-receiving surface can be focused as a beam spot. Therefore, the intensity distribution can be optically displayed as the intensity of the light spot.

A proper space is formed between the image formation lens 13a and the projection photosensor 15a in the above embodiment. However, if the image on the screen of the display 11 is focused at the end face of the lens on the side of the projection photosensor 15a by means of the image formation lens 13a, the image formation lens 13a can be brought into contact with the light-receiving surface of the projection photosensor 15a.

Figure 14:
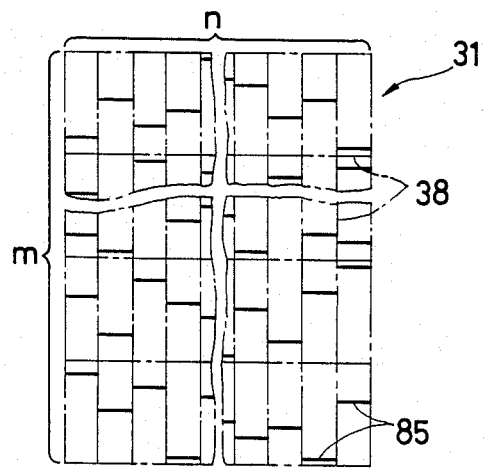

In the above embodiment, the vector discriminator 30 processes $5 \times 2$ vector components. However, in general, the number of vector components may be $m \times n$ (each of m and n is a natural number), as shown in FIG. 14. If the number of photosensor elements on which the input image is formed in the projection photosensor 15a is m and the number of projection photosensors 15a arranged in the first photosensor array 15 is n, $m \times n$ bright line patterns are formed on the vector display 31. Therefore, a bright line pattern 85 corresponds to the set of n m-vector. Conditions $m=1$ and $n=1$ may be given. In this case, the brightness pattern corresponds to a one-dimensional vector.

In the above embodiment, the areas 41 to 50 respectively corresponding to the vector components $a_1$ to $a_{10}$ are formed on the vector display 31, and the bright line patterns 51a to 60a corresponding to the vector components $a_1$ to $a_{10}$ are displayed in the areas 41 to 50, respectively. However, the plurality of bright line patterns 51a to 60a may be simultaneously displayed in the areas 41 to 50, respectively. For example, in the above embodiment shown in FIGS. 1 and 9 to 12, the areas 46 to 50 may be omitted, and each two of the bright line patterns 51a to 60a are displayed in a corresponding one of the areas 41 to 45. In this case, the areas 66 to 70 are omitted in the reference mask 35a. Each of the reference patterns 71 to 75 in the remaining areas 61 to 65 is designed to have a shape corresponding to the two bright line patterns.

The reference mask 35a used in the vector discriminator 30 may have reference patterns of predetermined shapes which are not changed. Alternatively, the reference pattern may be made of a spatial modulation element. In this case, the spatial modulation element using a liquid crystal as the display medium is located as the reference mask 35a. The reference data corresponding to each reference pattern is digitally stored in a data base. The reference data is transferred from the data base to the spatial modulation element, as needed. The different types of reference patterns on the basis of the reference data are formed by the corresponding spatial modulation elements.

If the reference mask 35a is constituted as a variable mask by the spatial modulation elements, the reference patterns corresponding to desired images are sequentially patterned on the basis of the reference data read out from the data base. Therefore, reference patterns can be sequentially matched with the bright line patterns corresponding to the images to be discriminated.

In the above embodiment, the intensity polarity of the reference pattern of the reference mask 35a is the same as that of the bright line patterns displayed on the vector display 31. However, the opposite polarities may be employed. The optical pattern displayed on the vector display 31 is a bright line pattern. However, if the intensity distribution is expressed as the intensity of a light spot, a simple optical pattern such as a dot array may be employed.

In the above embodiment, a total amount of light passing through the large number of reference patterns of one reference mask 35a is detected by the single photosensor 37a. However, the amounts of lights passing through the individual reference patterns may be independently detected by separate photosensors. In the above embodiment, the light passing through the reference mask 35a is detected. However, light reflected or absorbed by each reference mask 35a may be detected.

In the above embodiment, a proper space is formed between the image formation lens 33a and the reference mask 35a. However, if the bright line pattern on the vector display 31 is formed at the end face of the image formation lens 33a on the side of the reference mask 35a, the image formation lens 33a may be brought into contact with the reference mask 35a.

In the above embodiment, the image pattern on the original is read by the image sensor, and the read image is displayed on the screen of the display 11. The displayed image is multiplied by the first multiplier 14. However, the original may be directly located a a position corresponding to the image of the display 11, and the image pattern on the original may be directly multiplied by the first multiplier 14.

In the above embodiment, images to be recognized include alphanumeric symbols (i.e., letters and Arabic numerals), Japanese hiragana characters, Japanese katakana characters, and Chinese characters. In this case, characters may be printed or handwritten characters of a Gothic type, a Ming type or the like. The present invention can also be applied to recognition processing or recognition of various types of information such as figures.

If various types of reference masks 35a are used, the vector discriminators may be arranged parallel to each other and different mask arrays 35 may be respectively arranged in the discriminators 30, as shown in FIG. 1. In other words, a large-capacity reference mask data base may be divided into an appropriate number of sections respectively assigned to the discriminators 30, thereby performing simultaneous processing.

What is claimed is:

1. A simultaneous projection feature analysis apparatus comprising:

first multiplying means for optically multiplying an input image to form a plurality of optical pattern images of a substantially identical shape, said first multiplying means comprising a first projection lens and first lens array;

different types of means for detecting different types of one-dimensional projection intensity distributions in a plurality of directions from the plurality of optical pattern images;

a vector display for causing the different types of one-dimensional projection intensity distributions to correspond to a vector and displaying predetermined optical pattern images at positions corresponding to magnitudes of vector components of the vector;

different types of reference masks having reference patterns to be matched with the predetermined optical pattern images;

second multiplying means for multiplying the predetermined optical pattern image displayed on the vector display to form a plurality of optical pattern images of a substantially identical shape near said different types of reference masks, said second multiplying means comprising a second projection lens and second lens array; and photodetecting means for detecting lights derived from matching between the optical pattern images formed by said second multiplying means and the reference patterns through said different types of reference masks.

2. An apparatus according to claim 1, further comprising:

an image sensor for detecting the input image;

preprocessing means for preprocessing the image signal from said image sensor so as to shape the image; and a first display for displaying as an optical input image the image signal preprocessed by said preprocessing means, the input image displayed on said display being optically multiplied by said first multiplying means.

3. An apparatus according to claim 1 wherein each of said different types of means for detecting different types of one-dimensional projection intensity distributions in a plurality of directions comprises a light-receiving surface as a combination of a plurality of photosensor elements, the combinations of said plurality of photosensor elements in said light-receiving surfaces being different from each other in said different types of means for detecting different types of one-dimensional projection intensity distributions in a plurality of directions, and the plurality of optical pattern images formed by said first mulitplying means are respectively formed on said light-receiving surfaces of said different types of means for detecting different types of one-dimensional projection intensity distributions in a plurality of directions.

4. An apparatus according to claim 1, wherein at least one of said different types of means for detecting different types of one-dimensional projection intensity distributions in a plurality of directions comprises a plurality of strip-like photosensor elements, said strip-like photosensor elements being arranged adjacent to each other along one direction.

5. An apparatus according to claim 4, wherein said one direction is inclined with respect to the optical pattern images subjected to projection feature detection.

6. An apparatus according to claim 1, wherein at least one of said different types of means for detecting different types of one-dimensional projection intensity distributions in a plurality of directions comprises a plurality of square photosensor elements having substantially an identical size, said square photosensor elements being arranged to be adjacent to each other in a matrix form.

7. An apparatus according to claim 4, wherein the plurality of photosensors are arranged to partially correspond to the optical pattern images subjected to one-dimensional projection intensity distribution in a plurality of directions detection.

8. An apparatus according to claim 1, wherein at least one of said different type of means for detecting different types of one-dimensional projection intensity distributions in a plurality of directions comprises a plurality of annular photosensor elements having different diameters which are sequentially changed, said annular photosensor elements being sequentially arranged in a radial direction.

9. An apparatus according to claim 1, wherein at least one of said different types of means for detecting different types of one-dimensional projection intensity distributions in a plurality of directions comprises a plurality of sector-shaped phototsensor elements which are sequentially arranged such that vertices thereof are concentrated substantially at one point so as to constitute a circle.

10. An apparatus according to claim 1 wherein each of said different types of means for detecting different types of one-dimensional projection intensity distributions in a plurality of directions comprises combinations of different types of masks having projection slits formed at different positions and single element sensors arranged in correspondence with said different types of masks, said projection slits having different patterns in said different types of means for detecting different types of one-dimensional projection intensity distributions in a plurality of directions, and the plurality of optical pattern images multiplied by said first multiplying means being respectively projected on said single element sensors through said projections slits.

11. An apparatus according to claim 1, further comprising display control means for receiving projection data from said different types of means for detecting different types of one-dimensional projection intensity distributions in a plurality of directions and for controlling to display the predetermined optical pattern images at positions corresponding to the magnitudes of the projection data on a screen of said vector display.

12. An apparatus according to claim 1, wherein the reference patterns formed on said reference mask have a predetermined shape which is not changed to another shape.

13. An apparatus according to claim 1, wherein the reference pattern formed on said reference mask comprises a spatial modulation element, and the reference patterns respectively constituted by said spatial modulation elements are changed according to reference data transferred from a data base.

14. An apparatus according to claim 1, wherein the reference pattern formed on said reference mask is constituted by a gray scale.

* * * * *

UNITED STATES PATENT AND TRADEMARK OFFICE
CERTIFICATE OF CORRECTION

PATENT NO.  : 4,845,766

DATED       : July 4, 1989

INVENTOR(S) : Norman A. Peppers, et al.

It is certified that error appears in the above-identified patent and that said Letters Patent is hereby corrected as shown below:

Col. 3, line 64, "direction" should be --directions--.

Col. 6, line 15, "sam" should be --same--.

Col. 8, line 8, after the word "detected", insert --.--.

Signed and Sealed this

Twelfth Day of March, 1991

*Attest:*

HARRY F. MANBECK, JR.

*Attesting Officer*   *Commissioner of Patents and Trademarks*